United States Patent
Diao et al.

(10) Patent No.: US 9,377,321 B2
(45) Date of Patent: Jun. 28, 2016

(54) NAVIGATION SYSTEM WITH SEMI-AUTOMATIC POINT OF INTEREST EXTRACTION MECHANISM AND METHOD OF OPERATION THEREOF

(75) Inventors: Qian Diao, Cupertino, CA (US); Daqing Li, San Jose, CA (US)

(73) Assignee: TELENAV, INC., Santa Clara, CA (US)

( * ) Notice: Subject to any disclaimer, the term of this patent is extended or adjusted under 35 U.S.C. 154(b) by 0 days.

(21) Appl. No.: 13/297,959

(22) Filed: Nov. 16, 2011

(65) Prior Publication Data

US 2013/0124080 A1 May 16, 2013

(51) Int. Cl.
- G01C 21/00 (2006.01)
- G01C 21/26 (2006.01)
- G01C 21/36 (2006.01)

(52) U.S. Cl.
CPC .......... *G01C 21/362* (2013.01); *G01C 21/3679* (2013.01)

(58) Field of Classification Search
USPC ........................................................ 345/635
See application file for complete search history.

(56) References Cited

U.S. PATENT DOCUMENTS

| | | | |
|---|---|---|---|
| 6,336,073 B1 * | 1/2002 | Ihara et al. ..................... | 701/533 |
| 6,792,576 B1 | 9/2004 | Chidlovskii | |
| 7,007,017 B2 | 2/2006 | Bergholz et al. | |
| 2004/0111400 A1 | 6/2004 | Chevalier | |
| 2006/0161564 A1 | 7/2006 | Pierre et al. | |
| 2008/0155009 A1 * | 6/2008 | Jensen et al. .................. | 709/202 |
| 2009/0006382 A1 * | 1/2009 | Tunkelang et al. ............... | 707/5 |
| 2009/0132555 A1 * | 5/2009 | Singh et al. .................... | 707/100 |
| 2011/0106441 A1 * | 5/2011 | Robinson ........... | G01C 21/3679 701/532 |
| 2012/0101721 A1 * | 4/2012 | Diao ............................. | 701/426 |

* cited by examiner

*Primary Examiner* — Yonel Beaulieu
*Assistant Examiner* — Lail Kleinman
(74) *Attorney, Agent, or Firm* — IP Investment Law Group

(57) ABSTRACT

A method of operation of a navigation system includes: extracting a feature from a sample field with a manual label associated with a point of interest, the feature for locating the sample field in a document; generating a rule based on the feature extracted to assign the manual label to a target field; extracting the target field from the document with the manual label assigned by applying the rule to the document; and inserting the target field associated with the point of interest to a location-based guide for displaying on a device.

20 Claims, 6 Drawing Sheets

NAVIGATION SYSTEM WITH SEMI-AUTOMATIC POINT OF INTEREST EXTRACTION MECHANISM AND METHOD OF OPERATION THEREOF

TECHNICAL FIELD

The present invention relates generally to a navigation system, and more particularly to a navigation system with a point of interest extraction mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information. This real-time information can be extracted from pool of documents, such as from the World Wide Web or the Internet. However, a failure to extract all the fields and align the fields from one document to another document continues to be a paramount concern for the consumer.

Thus, a need still remains for a navigation system with a point of interest (POI) extraction mechanism to collect POI information from different entries in different document pages. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: extracting a feature from a sample field with a manual label associated with a point of interest, the feature for locating the sample field in a document; generating a rule based on the feature extracted to assign the manual label to a target field; extracting the target field from the document with the manual label assigned by applying the rule to the document; and inserting the target field associated with the point of interest to a location-based guide for displaying on a device.

The present invention provides a navigation system including: a sample extract module, for extracting a feature from a sample field with a manual label associated with a point of interest, the feature for locating the sample field in a document; a rule module, coupled to the sample extract module, for generating a rule based on the feature extracted to assign the manual label to a target field; an auto extract module, coupled to the rule module, for extracting the target field from the document with the manual label assigned by applying the rule to the document; and a display module, coupled to the auto extract module, for inserting the target field associated with the point of interest to a location-based guide for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
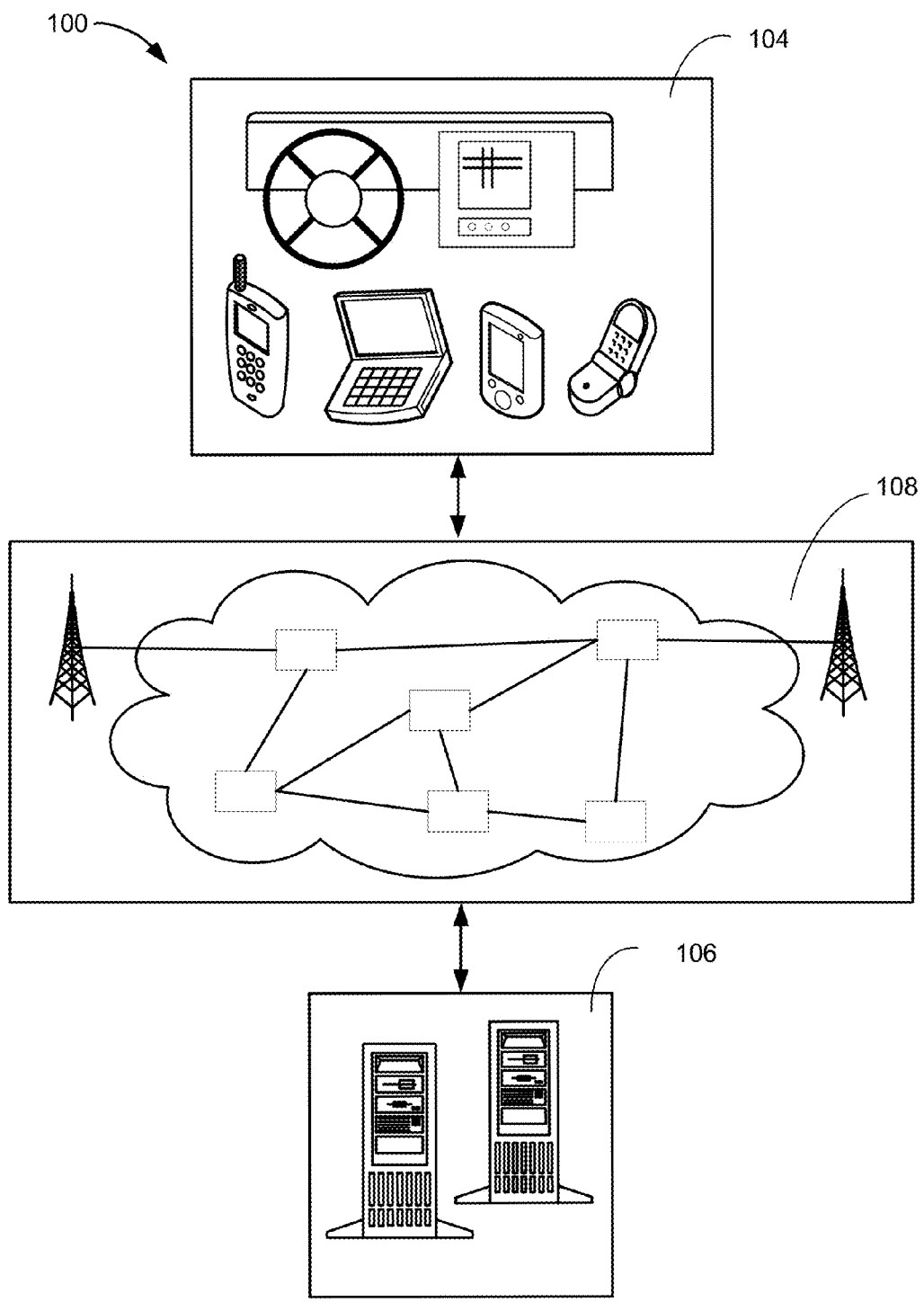
FIG. 1 is a navigation system with semi-automatic point of interest extraction mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. As a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "navigation-related information" or "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with semi-automatic point of interest extraction mechanism in an embodiment of the present invention. The navigation system 100 includes a first device 104, such as a client or a server, connected to a second device 106, such as a client or server, with a communication path 108, such as a wireless or wired network.

For example, the first device 104 can be of any of a variety of mobile devices, such as a cellular phone, personal digital assistant, a notebook computer, automotive telematic navigation system, or other multi-functional mobile communication or entertainment device. The first device 104 can be a standalone device, or can be incorporated with a vehicle, for example a car, truck, bus, or train. The first device 104 can couple to the communication path 108 to communicate with the second device 106.

For illustrative purposes, the navigation system 100 is described with the first device 104 as a mobile computing device, although it is understood that the first device 104 can be different types of computing devices. For example, the first device 104 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 108 to communicate with the first device 104. The second device 106 can also be a client type device as described for the first device 104.

In another example, the first device 104 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 104 as end points of the communication path 108, although it is understood that the navigation system 100 can have a different partition between the first device 104, the second device 106, and the communication path 108. For example, the first device 104, the second device 106, or a combination thereof can also function as part of the communication path 108.

The communication path 108 can be a variety of networks. For example, the communication path 108 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 108. Ethernet, digital subscriber line (DSL), fiber to the home (FTTH), and plain old telephone service (POTS) are examples of wired communication that can be included in the communication path 108.

Further, the communication path 108 can traverse a number of network topologies and distances. For example, the communication path 108 can include direct connection, personal area network (PAN), local area network (LAN), metropolitan area network (MAN), wide area network (WAN) or any combination thereof.

Figure 2:
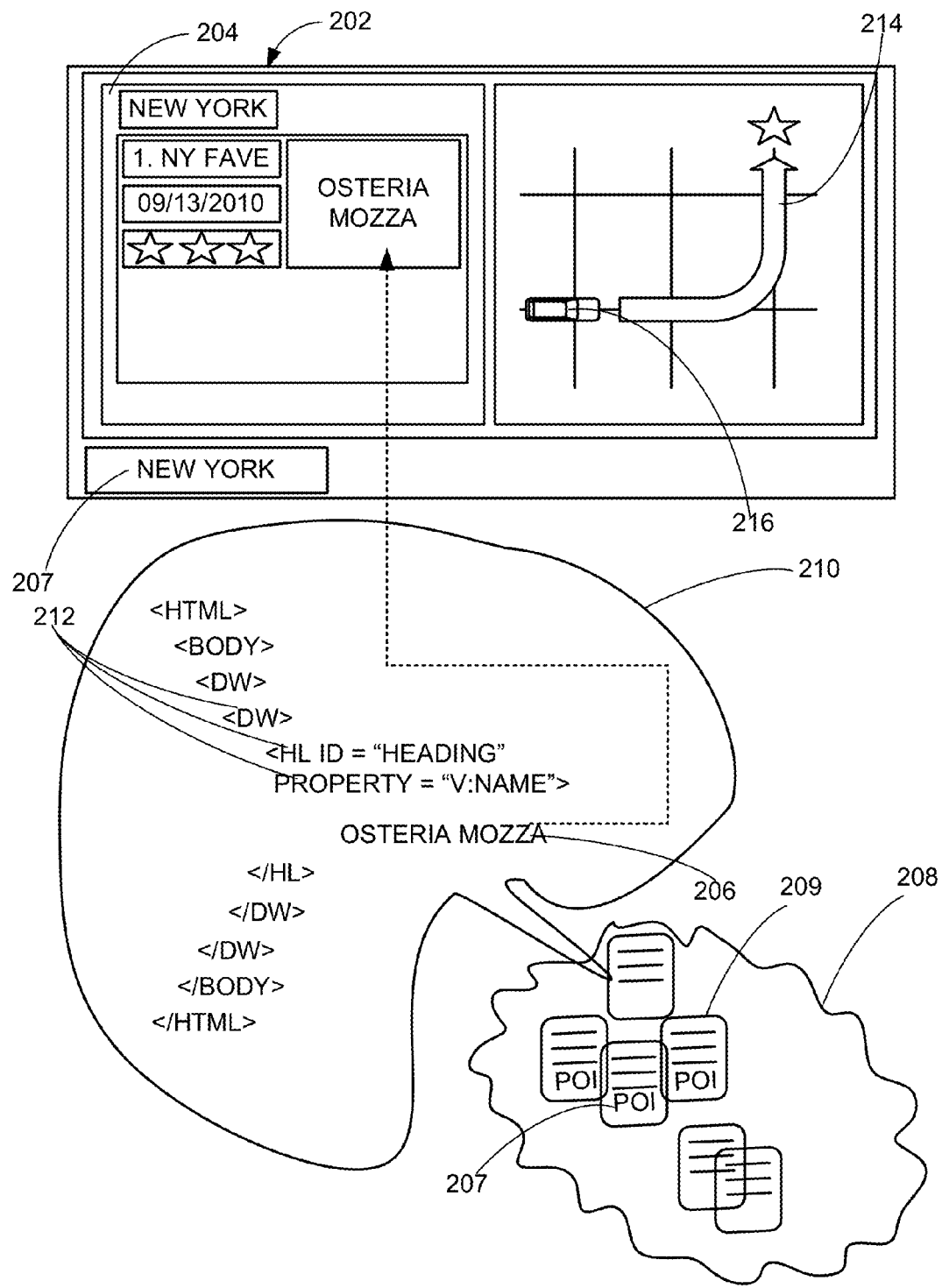
FIG. 2 is a display example of a location-based guide for the navigation system of FIG. 1.

Referring now to FIG. 2, therein is shown a display example of a location-based guide 202 for the navigation system 100 of FIG. 1. The location-based guide 202 can include a location relevant page 204 generated by the navigation system 100. The location relevant page 204 is defined as a page of target fields 206 associated with a point of interest 207. For example, the navigation system 100 can extract the target fields 206 associated with the point of interest 207 from the second device 106 of FIG. 1, and send the target fields 206 over to the first device 104 of FIG. 1 for display on the location relevant page 204.

Each of the target fields 206 is defined as a unit of the relevant information regarding a particular aspect, characteristic, review, property, label, or sign of the point of interest 207. The point of interest 207 is defined as the physical location of where the user of the navigation system 100 of FIG. 1 is interested in reaching. Documents 208 can include target fields 206.

The documents 208 are defined as digital files containing real world location-based information on storage devices. For example, the documents 208 can reside on non-transitory storage medium on the first device 104, non-transitory storage medium on the second device 106 of FIG. 1, or other non-transitory storage medium accessible to the first device 104 or the second device 106. The documents 208 can include navigation-related documents 209. The navigation-related documents 209 are defined as the documents 208 containing relevant information regarding the point of interest 207.

For example, the point of interest 207 can be California Academy of Science (CAS). One of the target fields 206 can be the location of CAS. As another example, one of the target fields 206 can be the telephone number of CAS. The documents 208 can include a travel document, such as Www.tripadvisor.com™. The documents 208 can include the target fields 206 of CAS by travelers who had traveled to CAS. Each of the documents 208 can include only a single one of the target fields 206 or a plurality of the target fields 206.

The target fields 206 can be embedded within a markup language code 210 of the documents 208. The target fields 206 can include features 212. The features 212 are defined as portions of the markup language code 210 that can serve as syntactic or semantic flags or tags for identifying and locating the target fields 206.

For example, the features 212 can include semantic features from the content of the target fields 206. For another example, the features 212 can include syntactic features such as Part of Speech (POS) tags, font size, content length, properties derived from regular expression filters, and so on. The properties derived from regular express filters can include whether the target fields 206 contain digits or capitalization. The features 212 can further include xpath, html tag, Document Object Model (DOM) attributes or font size of the target fields 206.

Xpath is defined as a string in a markup language, such as XML or HTML, for selecting nodes from the document written in the markup language. DOM attributes are defined as attributes of the target fields 206 written in a cross-platform and language-independent convention better known as the Document Object Model. Aspects of the DOM (such as its "elements") may be addressed and manipulated within the syntax of the programming or markup language in use.

The location-based guide 202 can also include a route 214. The route 214 is defined as a path that a vehicle or a person with the navigation system 100 can take to reach from a current location 216 to the point of interest 207. The current location 216 is defined as the current physical location of the first device 104. For example, the route 214 can represent a path from the current location 216 representing Edgewater, N.J. to the point of interest 207 representing New York City.

The physical transformation from displaying the location-based guide 202 including the location relevant page 204 results in movement in the physical world, such as people using the first device 104, the vehicle, or a combination thereof, based on the operation of the navigation system 100. The user of the navigation system 100 can select the point of interest 207 from the location-based guide 202 after considering the location relevant page 204. The current location 216 can start from where the user had selected the point of interest 207, and the travel route 214 can start from the current location 216 to the point of interest 207. As the movement in the physical world occurs, the movement itself creates additional information that is converted back to the current location 216 for the continued operation of the navigation system 100 and to continue the movement in the physical world.

Figure 3:
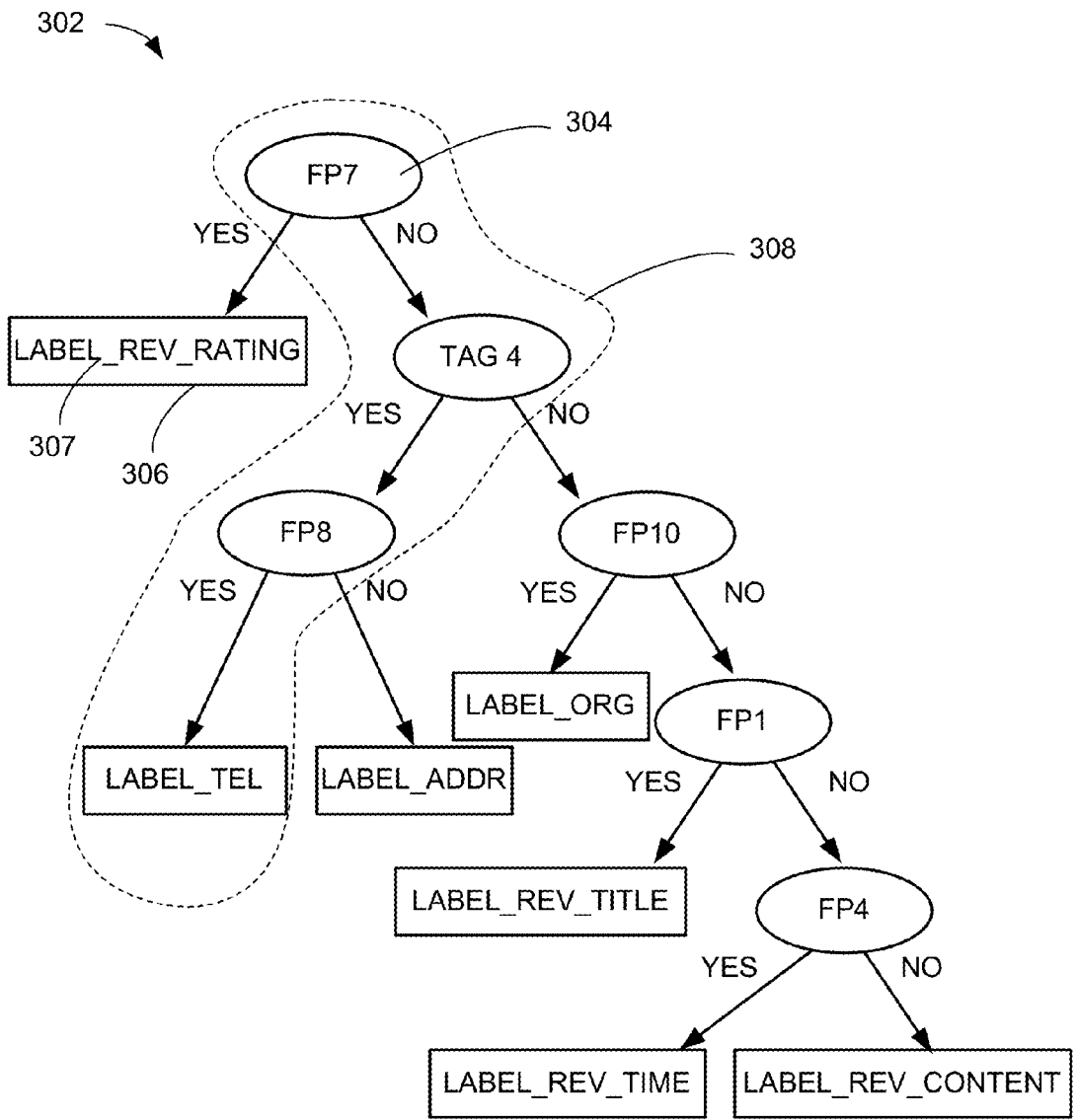
FIG. 3 is an example of a decision tree in a rule induction stage of operation of the navigation system of FIG. 1.

Referring now to FIG. 3, therein is shown an example of a decision tree 302 in a rule induction stage of operation of the navigation system 100 of FIG. 1. The decision tree 302 is defined as a hierarchical data structure organized by nodes and branches for generating a set of rules for identifying a known outcome or category given the features 212 of FIG. 2 of the target fields 206 of FIG. 2. The decision tree 302 includes a root node 304 and several of leaf nodes 306.

The root node 304 is defined as the top most node in the decision tree 302 and from which all other nodes of the decision tree 302 originate. The leaf nodes 306 are defined as end points of the decision tree 302 where no further nodes of the decision tree 302 can be reached.

Each category of the target fields 206 can include a POI label 307. The POI label 307 is defined as a name given to the category of the target fields 206 for the navigation system 100 to extract. For example, the POI label 307 can be brand name, telephone number, address, review rating, review title, review content, or review time, each representing a category of the relevant information of the point of interest 207. The leaf nodes 306 can be where the POI label 307 will be assigned.

The decision tree 302 can generate rules 308. The rules 308 are defined by the paths taken from the root node 304 to each of the leaf nodes 306. For example, the dotted area for the rules 308 in FIG. 3 shows a particular rule that traverses through the root node "FP7", the node "TAG 4", the node "FP8", and to the leaf node "LABEL_TEL". This particular example of the rules 308 shows that the presence of the features "FP7", "TAG 4", and "FP8" corresponds to an example of the target fields 206 with the POI label 307 of "LABEL_TEL".

The example of the decision tree 302 in FIG. 3 is based on Table 1 below.

TABLE 1

An example of a set of point of interest labels (POI label) from the feature extraction result.

| ID | Label | TAG 1 | TAG 2 | TAG 3 | TAG 4 | TAG 5 | FP1 | FP2 | FP3 | FP4 | FP5 | FP6 | FP7 | FP8 | FP9 | FP10 |
|----|-------|-------|-------|-------|-------|-------|-----|-----|-----|-----|-----|-----|-----|-----|-----|------|
| 1  | ORG   |       |       |       |       | 1     |     |     |     |     |     |     |     |     |     | 1    |
| 2  | ADDR  |       |       |       | 1     |       |     |     |     |     |     |     |     |     | 1   |      |
| 3  | ADDR  |       |       |       | 1     |       |     |     | 1   |     |     |     |     |     |     |      |
| 4  | ADDR  |       |       |       | 1     |       |     |     |     | 1   |     |     |     |     |     |      |
| 5  | ADDR  |       |       |       | 1     |       |     |     |     |     |     | 1   |     |     |     |      |
| 6  | TEL   |       |       |       | 1     |       |     |     |     |     |     |     |     | 1   |     |      |
| 7  | REV_TITLE | 1 |       |       |       | 1     |     |     |     |     |     |     |     |     |     |      |
| 8  | REV_RATING |  |       |       | 1     |       |     |     |     |     |     |     | 1   |     |     |      |
| 9  | REV_TIME  |   |       | 1     |       |       |     |     |     |     |     | 1   |     |     |     |      |
| 10 | REV_CONTENT |  |      |       |       |       |     |     |     |     |     |     |     |     |     |      |

Referring to Table 1, therein is shown an example of a table of the POI label 307 and the features 212 corresponding to the POI label 307. FIG. 3 is an example of how the navigation system 100 can organize the target fields 206 with the POI label 307 by the features 212 of the target fields 206. "ID" represents an enumeration for different categories of the target fields 206. "Label" represents the POI label 307 for the categories of the target fields 206. "TAG . . . " and "FP . . . " represent the different instances of the features 212 that can be associated with the successful extraction of the target fields 206. As an example, "TAG . . . " can specifically represent markup language tag features where "FP . . . " can specifically represent xpath features.

For example, a "TAG" can be a Hyper Text Markup Language (HTML) tag for the POI label 307, such as "<span>" or "<b>". "FP" or "FootPrint" can be a kind of XPath of the POI label 307 in a HTML document, such as "/html/body/div/div/span" or "/html/head/". XPath can be used to target a particular piece of HTML content and extract it. "FP" can be a subset of the XPath of the POI label 307 where attribute related tags, such as font styles, font colors, or font sizes, are removed from the full XPath.

The table of the features 212 can be extracted from the markup language code 210 of FIG. 2 of the documents 208 of FIG. 2. As a specific example, the following is a pseudo-code block of how the features 212 can be extracted from the documents 208. In the specific example, the labeledHtmlPages can represent the documents 208, and the featureVectorSet can represent a list of the features 212.

```
FeatureExtraction(labeledHtmlPages) {
    featureVectorSet = null;
    for each page in labeledHtmlPages {
        for each node in the DOM tree of the page {
            if (node is labeled) {
                xpath = getHtmlXpath(node);
                tag = getHtmlTag(node);
                font = getFontSize(node);
                syntacticFeature = getSyntacticFeature(node.text( ));
                semanticFeature = getSemanticFeature(node.text( ));
                vector = {xpath, tag, font, syntacticFeature,
                          semanticFeature };
                featureVectorSet .add(vector);
            }
        }
    }
    return featureVectorSet ;
}
```

TABLE 2

The decision tree rule induction result from Table 1.

!FP7&!TAG4&FP8: LABEL_TEL
!FP7&!TAG4&!FP10&!FP1&FP4: LABEL_REV_TIME
!FP7&!TAG4&!FP10&FP1: LABEL_REV_TITLE
!FP7&!TAG4&FP10: LABEL_ORG
!FP7&TAG4&!FP8: LABEL_ADDR
!FP7&!TAG4&!FP10&!FP1&!FP4: LABEL_REV_CONTENT
FP7: LABEL_REV_RATING

Referring to Table 2, therein is shown an example of the rules 308 from the example of the features 212 in Table 1. Table 2 shows the potential examples of the rules 308, such as the example circled by the dotted lines, which corresponds to the first row of Table 2. There are seven of the leaf nodes 306 to the decision tree 302, and thus there are seven rows in Table 2, each corresponding to one of the leaf nodes 306.

Each row of Table 2 shows a possible Boolean equation used to determine whether a target field is to be extracted. The symbol "!" represents the Boolean operator "not". For example, "!FP7" can represent a rule stating that an entry can be labeled when a feature "FP7" is not present. The symbol "&" represents the Boolean operator "and". For example, "TAG4&FP10" can represent a rule stating that an entry can be labeled when a feature "TAG4" and a feature "FP10" are both present.

As a specific example, on the fourth line, "!FP7&!TAG4&FP10" indicates that when one of the target fields 206 is detected to be without the "FP7" feature, without the "TAG4" feature and with the "FP10" feature, then the entry can be labeled as "LABEL_ORG". "LABEL_ORG" is the POI label 307 for the target fields 206 that satisfy the Boolean requirement of "!FP7&!TAG4&FP10". Each row of Table 2 also refers to a path from the root node 304 to one of the leaf nodes 306 in the decision tree 302.

Figure 4:
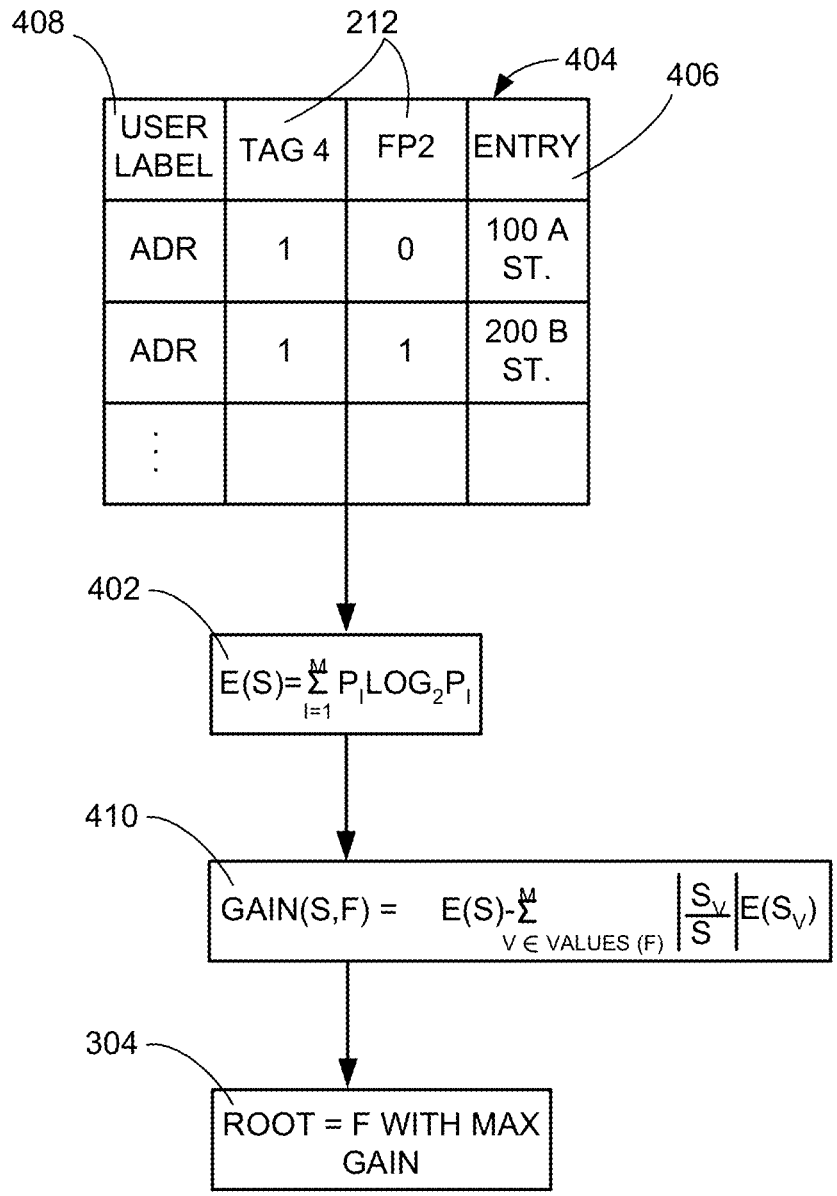
FIG. 4 is an example of a data flow of how the root node is selected.

Referring now to FIG. 4, therein is shown an example of a data flow of how the root node 304 is selected. The navigation system 100 of FIG. 1 can select the root node 304 of the decision tree 302 of FIG. 3 based on an information entropy 402 of a training dataset 404. The training dataset 404 is defined as a set of sample fields 406 corresponding to a manual label 408.

The sample fields 406 are defined as potential entries, similar to the target fields 206 of FIG. 2, for training the navigation system 100 to identify specific categories of information to extract. The manual label 408 is defined as the POI label 307 of FIG. 3 of an instance of the sample fields 406 assigned by a user of the navigation system 100.

It has been unexpectedly found that extracting the features 212 from the sample fields 406 with the manual label 408 associated with the point of interest 207 can improve the accuracy of relevant point of interest information extraction of the navigation system 100. The manual label 408 of the sample fields 406 increases the accuracy of the navigation system 100 by training the decision tree 302 with potential features that tend to identify entries containing the point of interest 207. Accordingly, extracting the features 212 from the sample fields 406 with the manual label 408 associated with the point of interest 207 can improve the accuracy of relevant information extraction for the navigation system 100.

The training dataset 404 can be used to generate the information entropy 402. The information entropy 402 is defined as a measure of the uncertainty associated with the training dataset 404. For example, the information entropy 402 can be represented by Equation 1 below.

$$E(S) = \sum_{i=1}^{m} p_i \log_2 p_i \qquad \text{Eq. 1}$$

"S" represents the training dataset 404. "$p_i$" represents the proportion of the training dataset 404 having the manual label 408, where the manual label 408 is denoted "$c_i$", for i=1, . . . m. "m" is defined as the number of possible categories of the manual label 408 in the training dataset 404. For example, if there are a total of ten entries in the training dataset 404, and two of the entries correspond to "LABEL_ORG", then $p_1$ can be denoted 2/10.

The information entropy 402 can generate an information gain 410. The information gain 410 is defined as the expected reduction in information entropy caused by partitioning the training dataset 404 according to the features 212. For example, the information gain 410 can be calculated by Equation 2 below.

$$\text{Gain}(S, F) = E(S) - \sum_{v \in \text{Values}(F)} \frac{|S_v|}{|S|} E(S_v) \qquad \text{Eq. 2}$$

Here, F represents a given instance of the features 212, whose values can range over a set of possibilities which is called Values(F). "$S_v$" is a subset within the training dataset 404 which have value "v" for the feature "F". In the example of FIG. 3, the value for each feature is binary, either a "1" for "yes", or a "0" for no. This is reflected in the Table 1 as well.

The information gain 410 can then be used to select the root node 304. One of the features 212 can be selected as the root node 304 when it has the highest value of the information gain 410 amongst others of the features 212. Once the root node 304 is selected, the method of selecting which instance of the features 212 can be selected as the next operating node can be the same as the method of selecting the root node 304. That is, the same procedure can be operated on each branch of the decision tree 302 to induce the remaining levels of the decision tree until all examples in a leaf belong to the same class. Hence, the decision tree 302 can be recursively constructed via calculation of the information gain 410 for each instance of the features 212.

The decision tree 302 can be used to determine the POI label 307 of an unseen example. To generate rules for feature extraction, the navigation system 100 can trace each path in the decision tree 302, from the root node 304 to the leaf nodes 306 of FIG. 3, recording the test outcomes as antecedents and the leaf nodes 306 classification as the consequent. Thus there would be one rule for every one of the leaf nodes 306.

In the rule induction stage of operation of the navigation system 100, the decision tree 302 can be used as the kernel algorithm for the rule induction. In the decision tree 302, if a given feature is observable, the explanation for the condition is easily explained by Boolean logic. As shown in Table 2, explanation of how the features 212 can be identified can be shown in a single-line text format, unlike other neural network and kernel methods.

It has been discovered that the decision tree 302 having transparent and user-readable white-box rules acting as nodes allows for easier quality assurance testing of the feature extract rules. Explanation of the Boolean logic used by the decision tree can be displayed as shown in Table 2. Accordingly, the decision tree 302 having transparent and user-readable rules acting as nodes allows for easier quality assurance testing for the navigation system 100.

As a specific example, when the user only provide one example in the training dataset 404 (which is an extreme case), and a feature "FP7" appears true in the feature vector, then the decision tree 302 is automatically reduced to an exact matching model by overfitting to the only example. It matches the feature "FP7" in the incoming web pages to extract the corresponding POI, which means if the DOM element has "FP7" then it is the target POI entry, otherwise, it is not. Because the decision tree 302 is a white box model, the user would be able to view the decision tree 302 and recognize that the current feature extraction rule is overfitting the training dataset 404.

On the other hand, when multiple labeled examples for an instance of the manual label 408 (e.g. the four examples for LABEL_ADDR in Table 1) are received, the sufficiently collected statistics can be used to account for the reliability of the model. Accordingly, the user can monitor the decision tree 302 in real-time to control the reliability of the decision tree 302 as a rule induction model.

The navigation system 100 can utilize the decision tree 302 in a semi-automatic POI extraction method, which uses the decision tree 302 as a white-box model, to encode the HTML Document Object Model (DOM) features. In the method, the navigation system 100 can include a wrapper generation stage including feature extraction and decision tree rule induction that is fully automatic, where the user only provides a limited size of the training dataset 404 to guide it. The method can achieve accuracy of up to 95%.

Figure 5:
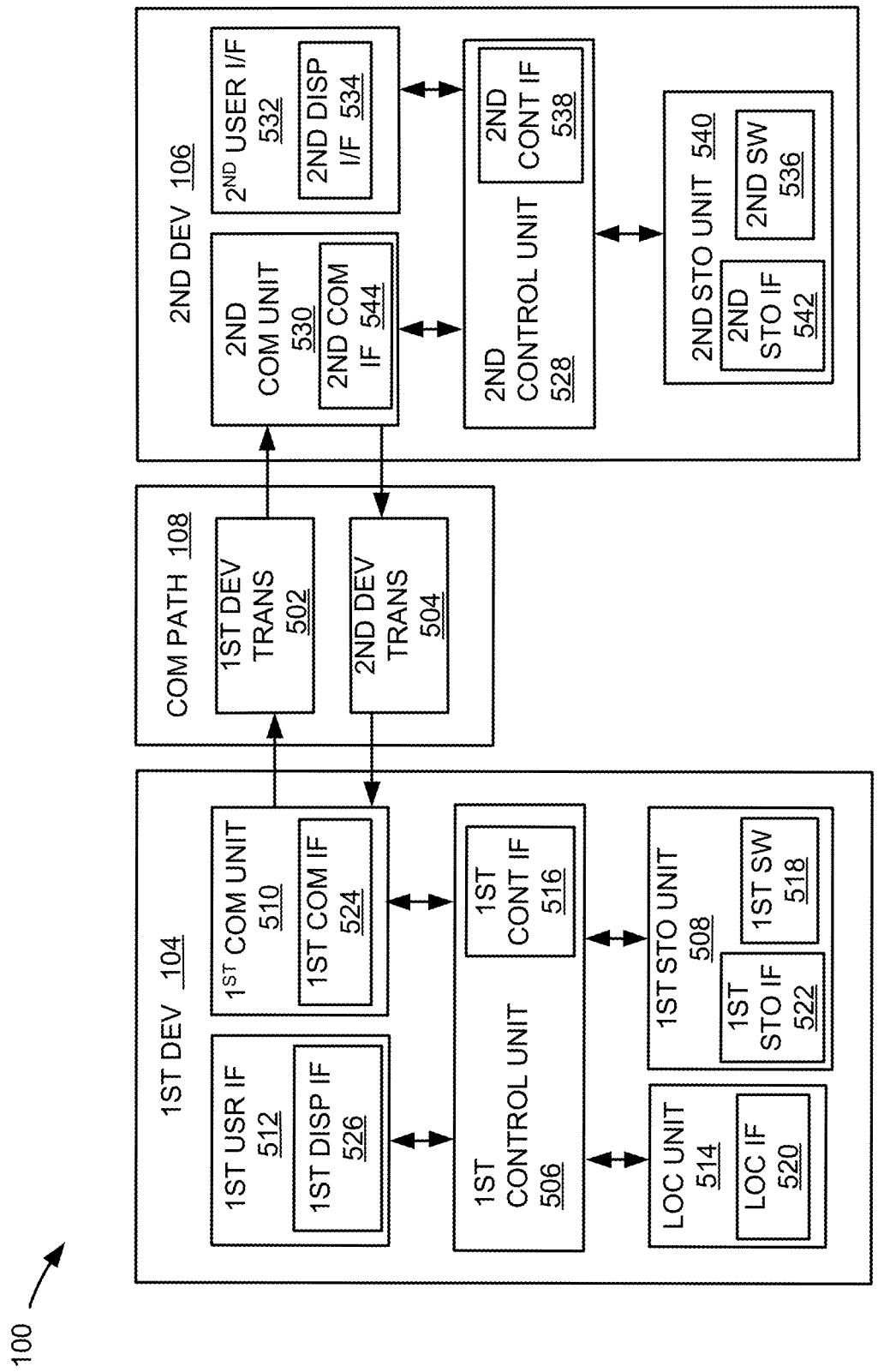
FIG. 5 is an exemplary block diagram of the navigation system of FIG. 1.

Referring now to FIG. 5, therein is shown an exemplary block diagram of the navigation system 100 of FIG. 1. The navigation system 100 can include the first device 104, the communication path 108, and the second device 106. The first device 104 can send information in a first device transmission 502 over the communication path 108 to the second device 106. The second device 106 can send information in a second device transmission 504 over the communication path 108 to the first device 104.

For illustrative purposes, the navigation system 100 is shown with the first device 104 as a client device, although it is understood that the navigation system 100 can have the first device 104 as a different type of device. For example, the first device 104 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 104 will be described as a client device and the second device 106 will be described as a server device. The present invention is not limited to this selection for the type of devices. The selection is an example of the present invention.

The first device 104 can include a first control unit 506, a first storage unit 508, a first communication unit 510, a first user interface 512, and a location unit 514. The first control unit 506 can include a first control interface 516. The first control unit 506 can execute a first software 518 to provide the intelligence of the navigation system 100. The first control unit 506 can be implemented in a number of different manners. For example, the first control unit 506 can be a processor, an embedded processor, a microprocessor, a hardware control logic, a hardware finite state machine (FSM), a digital signal processor (DSP), or a combination thereof. The first control interface 516 can be used for communication between the first control unit 506 and other functional units in the first device 104. The first control interface 516 can also be used for communication that is external to the first device 104.

The first control interface 516 can receive information from the other functional units or from external sources, or can transmit information to the other functional units or to external destinations. The external sources and the external destinations refer to sources and destinations physically separate from the first device 104.

The first control interface 516 can be implemented in different ways and can include different implementations depending on which functional units or external units are being interfaced with the first control interface 516. For example, the first control interface 516 can be implemented with a pressure sensor, an inertial sensor, a microelectromechanical system (MEMS), optical circuitry, waveguides, wireless circuitry, wireline circuitry, or a combination thereof.

The location unit 514 can generate location information, current heading, and current speed of the first device 104, as examples. The location unit 514 can be implemented in many ways. For example, the location unit 514 can function as at least a part of a global positioning system (GPS), an inertial navigation system, a cellular-tower location system, a pressure location system, or any combination thereof.

The location unit 514 can include a location interface 520. The location interface 520 can be used for communication between the location unit 514 and other functional units in the first device 104. The location interface 520 can also be used for communication that is external to the first device 104.

The location interface 520 can receive information from the other functional units or from external sources, or can transmit information to the other functional units or to external destinations. The external sources and the external destinations refer to sources and destinations physically separate from the first device 104.

The location interface 520 can include different implementations depending on which functional units or external units are being interfaced with the location unit 514. The location interface 520 can be implemented with technologies and techniques similar to the implementation of the first control interface 516.

The first storage unit 508 can store the first software 518. The first storage unit 508 can also store the relevant information, such as advertisements, points of interest (POI), navigation routing entries, or any combination thereof.

The first storage unit 508 can be a volatile memory, a nonvolatile memory, an internal memory, an external memory, or a combination thereof. For example, the first storage unit 508 can be a nonvolatile storage such as nonvolatile random access memory (NVRAM), Flash memory, disk storage, or a volatile storage such as static random access memory (SRAM).

The first storage unit 508 can include a first storage interface 522. The first storage interface 522 can be used for communication between the storage unit 508. The first storage interface 522 can be used for communication that is external to the first device 104.

The first storage interface 522 can receive information from the other functional units or from external sources, or can transmit information to the other functional units or to external destinations. The external sources and the external destinations refer to sources and destinations physically separate from the first device 104.

The first storage interface 522 can include different implementations depending on which functional units or external units are being interfaced with the first storage unit 508. The first storage interface 522 can be implemented with technologies and techniques similar to the implementation of the first control interface 516.

The first communication unit 510 can enable external communication to and from the first device 104. For example, the first communication unit 510 can permit the first device 104 to communicate with the second device 106 of FIG. 1, such as a peripheral device or a computer desktop, and the communication path 108.

The first communication unit 510 can also function as a communication hub allowing the first device 104 to function as part of the communication path 108 and not limited to be an end point or terminal unit to the communication path 108. The first communication unit 510 can include active and passive components, such as microelectronics or an antenna, for interaction with the communication path 108.

The first communication unit 510 can include a first communication interface 524. The first communication interface 524 can be used for communication between the first communication unit 510 and other functional units in the first device 104. The first communication interface 524 can receive information from the other functional units or can transmit information to the other functional units.

The first communication interface 524 can include different implementations depending on which functional units are being interfaced with the first communication unit 510. The first communication interface 524 can be implemented with technologies and techniques similar to the implementation of the first control interface 516.

The first user interface 512 allows a user (not shown) to interface and interact with the first device 104. The first user interface 512 can include an input device and an output device. Examples of the input device of the first user interface 512 can include a keypad, a touchpad, soft-keys, a keyboard, a microphone, or any combination thereof to provide data and communication inputs.

The first user interface 512 can include a first display interface 526. The first display interface 526 can include a display, a projector, a video screen, a speaker, or any combination thereof.

The first control unit 506 can operate the first user interface 512 to display information generated by the navigation system 100. The first control unit 506 can also execute the first software 518 for the other functions of the navigation system 100, including receiving location information from the location unit 514. The first control unit 506 can further execute the first software 518 for interaction with the communication path 108 via first communication unit 510.

The second device 106 can be optimized for implementing the present invention in a multiple device embodiment with the first device 104. The second device 106 can provide the additional or higher performance processing power compared to the first device 104. The second device 106 can include a second control unit 528, a second communication unit 530, and a second user interface 532.

The second user interface 532 allows a user (not shown) to interface and interact with the second device 106. The second user interface 532 can include an input device and an output device. Examples of the input device of the second user interface 532 can include a keypad, a touchpad, soft-keys, a keyboard, a microphone, or any combination thereof to provide data and communication inputs. Examples of the output device of the second user interface 532 can include a second display interface 534. The second display interface 534 can include a display, a projector, a video screen, a speaker, or any combination thereof.

The second control unit 528 can execute a second software 536 to provide the intelligence of the second device 106 of the navigation system 100. The second software 536 can operate in conjunction with the first software 518. The second control unit 528 can provide additional performance compared to the first control unit 506.

The second control unit 528 can operate the second user interface 532 to display information. The second control unit 528 can also execute the second software 536 for the other functions of the navigation system 100, including operating the second communication unit 530 to communicate with the first device 104 over the communication path 108.

The second control unit 528 can be implemented in a number of different manners. For example, the second control unit 528 can be a processor, an embedded processor, a microprocessor, a hardware control logic, a hardware finite state machine (FSM), a digital signal processor (DSP), or a combination thereof.

The second control unit 528 can include a second control interface 538. The second control interface 538 can be used for communication between the second control unit 528 and other functional units in the second device 106. The second control interface 538 can also be used for communication that is external to the second device 106.

The second control interface 538 can receive information from the other functional units or from external sources, or can transmit information to the other functional units or to external destinations. The external sources and the external destinations refer to sources and destinations physically separate from the second device 106.

The second control interface 538 can be implemented in different ways and can include different implementations depending on which functional units or external units are being interfaced with the second control interface 538. For example, the second control interface 538 can be implemented with a pressure sensor, an inertial sensor, a microelectromechanical system (MEMS), optical circuitry, waveguides, wireless circuitry, wireline circuitry, or a combination thereof.

A second storage unit 540 can store the second software 536. The second storage unit 540 can also store the relevant information, such as advertisements, points of interest (POI), navigation routing entries, or any combination thereof. The second storage unit 540 can be sized to provide the additional storage capacity to supplement the first storage unit 508.

For illustrative purposes, the second storage unit 540 is shown as a single element, although it is understood that the second storage unit 540 can be a distribution of storage elements. Also for illustrative purposes, the navigation system 100 is shown with the second storage unit 540 as a single hierarchy storage system, although it is understood that the navigation system 100 can have the second storage unit 540 in a different configuration. For example, the second storage unit 540 can be formed with different storage technologies forming a memory hierarchal system including different levels of caching, main memory, rotating media, or off-line storage.

The second storage unit 540 can be a volatile memory, a nonvolatile memory, an internal memory, an external memory, or a combination thereof. For example, the second storage unit 540 can be a nonvolatile storage such as nonvolatile random access memory (NVRAM), Flash memory, disk storage, or a volatile storage such as static random access memory (SRAM).

The second storage unit 540 can include a second storage interface 542. The second storage interface 542 can be used for communication between the second storage unit 540 and other functional units in the second device 106. The second storage interface 542 can be used for communication that is external to the second device 106.

The second storage interface 542 can receive information from the other functional units or from external sources, or can transmit information to the other functional units or to external destinations. The external sources and the external destinations refer to sources and destinations physically separate from the second device 106.

The second storage interface 542 can include different implementations depending on which functional units or external units are being interfaced with the second storage unit 540. The second storage interface 542 can be implemented with technologies and techniques similar to the implementation of the second control interface 538.

The second communication unit 530 can enable external communication to and from the second device 106. For example, the second communication unit 530 can permit the second device 106 to communicate with the first device 104 over the communication path 108.

The second communication unit 530 can also function as a communication hub allowing the second device 106 to function as part of the communication path 108 and not limited to be an end point or terminal unit to the communication path 108. The second communication unit 530 can include active and passive components, such as microelectronics or an antenna, for interaction with the communication path 108.

The second communication unit 530 can include a second communication interface 544. The second communication interface 544 can be used for communication between the second communication unit 530 and other functional units in the second device 106. The second communication interface 544 can receive information from the other functional units or can transmit information to the other functional units.

The second communication interface 544 can include different implementations depending on which functional units are being interfaced with the second communication unit 530. The second communication interface 544 can be implemented with technologies and techniques similar to the implementation of the second control interface 538.

The first communication unit 510 can couple with the communication path 108 to send information to the second device 106 in the first device transmission 502. The second device 106 can receive information in the second communication unit 530 from the first device transmission 502 of the communication path 108.

The second communication unit 530 can couple with the communication path 108 to send information to the first device 104 in the second device transmission 504. The first device 104 can receive information in the first communication unit 510 from the second device transmission 504 of the communication path 108. The navigation system 100 can be executed by the first control unit 506, the second control unit 528, or a combination thereof.

For illustrative purposes, the second device 106 is shown with the partition having the second user interface 532, the second storage unit 540, the second control unit 528, and the second communication unit 530, although it is understood that the second device 106 can have a different partition. For example, the second software 536 can be partitioned differently such that some or all of its function can be in the second control unit 528 and the second communication unit 530. Also, the second device 106 can include other functional units not shown in FIG. 2 for clarity.

The functional units in the first device 104 can work individually and independently of the other functional units. The first device 104 can work individually and independently from the second device 106 and the communication path 108.

The functional units in the second device 106 can work individually and independently of the other functional units. The second device 106 can work individually and independently from the first device 104 and the communication path 108.

For illustrative purposes, the navigation system 100 is described by operation of the first device 104 and the second device 106. It is understood that the first device 104 and the second device 106 can operate any of the modules and functions of the navigation system 100. For example, the first device 104 is described to operate the location unit 514, although it is understood that the second device 106 can also operate the location unit 514.

Figure 6:
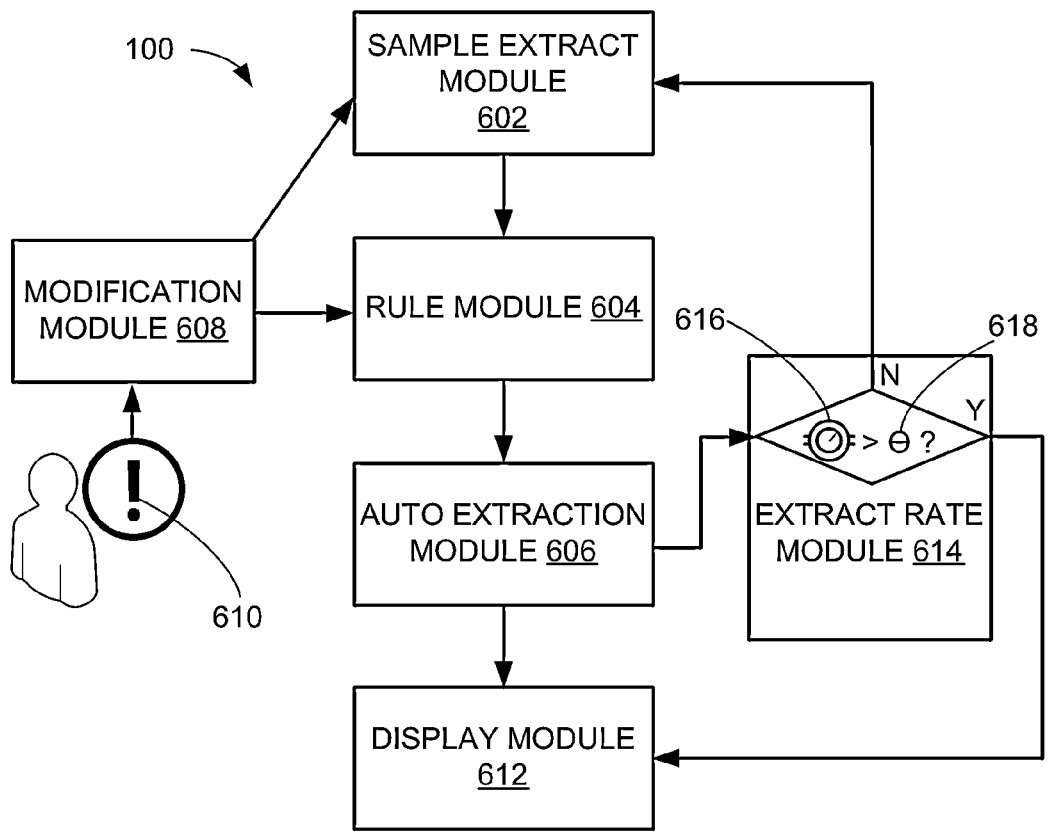
FIG. 6 is a control flow of the navigation system of FIG. 1.

Referring now to FIG. 6, therein is shown a control flow of the navigation system 100 of FIG. 1. The navigation system 100 can include a sample extract module 602. The sample extract module 602 is defined as a module of the navigation system 100 for extraction of features from sample POI entries with the manual label 408 of FIG. 4. The sample extract module 602 can function to extract an instance of the features 212 of FIG. 2 from an instance of the sample field 406 of FIG. 4 with the manual label associated with the point of interest 207 of FIG. 2, where the feature 212 can be for locating the sample field 406 in documents 208 of FIG. 2.

The sample extract module 602 can receive the sample fields 406 from the first user interface 512 of FIG. 5 or the second user interface 532 of FIG. 5. The features 212 can be binary values, such as binary values representing the presence or the lack of presence of a markup language tag. The features 212 can be syntactic, semantic, or both. The features 212 can be derived from regular expression filters.

The navigation system 100 can include a rule module 604. The rule module 604 is defined as a module of the navigation system 100 for generating a set of rules for assigning POI entry labels by observing features associated with user-identified sample POI entries. The rule module 604 can be coupled to the sample extract module 602. The rule module 604 can receive the sample fields 406, the features 212, and the manual label 408 from the sample extract module 602.

The rule module 604 can function to generate at least an instance of the rules 308 of FIG. 3 based on the feature 212 extracted to assign the manual label 408 to an instance of the target fields 206 of FIG. 2, with the manual label 408 and the features 212 received from the sample extract module 602. Once assigned, the manual label 408 can be the same as the POI label 307 of FIG. 3. The rule module 604 can also be for generating the rules 308 with the decision tree 302 of FIG. 3.

For example, the rule module 604 can be for calculating the information entropy 402 of FIG. 4 of the sample fields 406, with the sample fields 406 received from the sample extract module 602, and for calculating the information gain 410 of FIG. 4 of the features 212, with the features 212 received from the sample extract module 602. The rule module 604 can use the information gain 410 and the information entropy 402 to determine the structure of the decision tree 302 and the conditional order of the features 212 in the rules 308. The decision tree 302 can be used to determine the POI label 307 for future POI entries, such as in an auto extract module 606.

The rule module 604 can further be for displaying the rules 308 on the first display interface 526 of FIG. 5 or the second display interface 534 of FIG. 5 to give the users a chance to determine whether the rules 308 are overfitting the training dataset 404 of FIG. 4 or otherwise inefficient or illogical. The rule module 604 is for reducing the amount of manual work needed to scale through extraction and parsing of a high volume of potential POI entries from the documents 208. Because rule induction of the rule module 604 is an iterative process, the size of the training dataset 404 or the labeled examples can increase very slowly.

The rule module 604 can display the rules 308 to ensure a white box model where the users can directly understand the order of application and quality of the Boolean rules for extracting the target fields 206, and discover the possible weaknesses of the features selected as conditional requirements. The users can then input into the rule module 604 a few critical and representative features when weaknesses of the rules 308 are identified.

The navigation system 100 can include a modification module 608. The modification module 608 can be coupled to both the sample extract module 602 and the rule module 604. The modification module 608 is defined as a module of the navigation system 100 for assisting the users to manually modify the rules by identifying new rules, identifying new triggering features, or entering new sample fields.

The modification module 608 can function to receive a disconfirmation 610 of an instance or instances of the rules 308. The disconfirmation 610 can be received by the first user interface 512 of FIG. 5 or the second user interface 532 of FIG. 5. The disconfirmation 610 is defined as a message from the user indicating that the rules 308 are suboptimal in the eyes of user.

The sample extract module 602 can request and receive the sample fields 406 from the user when the disconfirmation 610 is received. The modification module 608 can also be coupled to the rule module 604 to allow manual modification of the rules 308.

The navigation system 100 can include the auto extract module 606. The auto extract module 606 can be coupled to the rule module 604. The auto extract module 606 is defined as a module of the navigation system 100 for identifying and extracting the target fields 206 from the documents 208 by applying the rules 308 to the documents 208, with the rules 308 from the rule module 604. The auto extract module 606 can function to extract the instance of the target field 208 from the documents 208 with the manual label 408 assigned by applying the rule 308 to the documents 208, with the rules 308 received from the rule module 604.

The auto extract module 606 can be for extracting the target fields 206 having the features 212 with binary values. The features 212 can be only binary values. The auto extract module 606 can also be for extracting the target fields 206 having the features 212 being syntactic, semantic, or both. The auto extract module 606 can further be for extracting the target fields 206 having the features 212 derived from regular expression filters.

The navigation system 100 can include a display module 612. The display module 612 can be coupled to the auto extract module 606. The display module 612 is defined as a module of the navigation system 100 for displaying the POI information extracted by the navigation system 100. The display module 612 can function to insert at least the instance of the target field 208 associated with the point of interest 207 to the location-based guide 202 for displaying on the first device 104, with the target fields 206 received from the auto extract module 606.

The navigation system 100 can include an extract rate module 614. The extract rate module 614 can be coupled to the auto extract module 606. The extract rate module 614 is defined as a module of the navigation system 100 for requesting for more sample fields to be entered by the user when the navigation system 100 has determined that the rules 308 are suboptimal or malfunctioning. The extract rate module 614 can function to request a further sample field 406 when an extraction rate 616 is less than a threshold 618, with the extraction rate 616 determined from the auto extract module 606. The extract rate module 614 can function to relay the target field 208 associated with the point of interest 207 from the auto extraction module 606 for displaying by the display module 612 when the extraction rate 616 is not less than the threshold 618.

The extraction rate 616 is defined as a rate of successful parsing of the documents 208 by application of the rules 308 to automatically locate and store the target fields 206. The extraction rate 616 can be measured by a count of how many times content is found in the documents 208 by application of the rules 308. The extraction rate 616 can be specific to each of the rules 308. The extraction rate 616 can also be measured by the count of how many times content is found in the documents 208 divided by the number of attempts to parse the documents 208.

As a specific example, the following pseudo code can represent the control flow of FIG. 6:

```
Wrapper(inputHtmlPages, threshold) {
    labelingTrigger = true;
    labeledHtmlPages =
    manuallyCreateLabeledHtmlPages(inputHtmlPages);
    resultSet = null;
    do {
```

-continued

```
        featureVectorSet = featureExtraction(labeledHtmlPages);
        ruleSet = decisionTreeID3(featureVectorSet);
        failedPageSet = null;
        for each input htmlpage {
            poiResult = decisionTreeInference(ruleSet, htmlpage);
            if (poiResult != null) {
                resultSet.add(poiResult);
            else
                failedPageSet.add(htmlpage);
        }
        if (resultSet.size( ) > threshold)
            labelingTrigger = false;
        else
            labeledHtmlPages = manuallyCreateLabeledHtmlPages
    (failedPageSet);
    } while (labelingTrigger == true);
    return resultSet;
}
```

Here, the "ruleSet" can represent the rules 308. The "featureVectorSet" can represent the features 212 extracted from the training dataset 404. The "resultSet.size( )" can represent the extraction rate 616. The "labelingTrigger" can represent a flag, when true, indicates that the user should enter more of the sample fields 406 for the training dataset 404. The "decisionTreeID3" can be a function to construct the decision tree 302 of FIG. 3. The "decisionTreeInference" can be a function to apply the rules 308 of the decision tree 302 to the documents 208 for extracting the target fields 206.

It has been discovered requesting at least one of the sample fields 406 when the extraction rate 616 is less than the threshold 618 provides the navigation system 100 with a feedback loop to ensure high accuracy POI extraction. Requesting at least one of the sample fields 406 when the extraction rate 616 is less than the threshold 618 serves to provide more manual examples for the navigation system 100 to learn and improve the accuracy of extraction only when it is necessary. The threshold 618 serves to prevent too much waste of resources in requesting the user to enter the sample fields 406 frequently. Requesting at least one of the sample fields 406 when the extraction rate 616 is less than the threshold 618 thereby ensures high accuracy of POI extraction without wasting user resources.

It has further been discovered generating the rules 308 from the decision tree 302 provides the navigation system 100 with a convenient and adaptive method of extracting relevant point of interest information from a large dataset. Generating the rules 308 from the decision tree 302 eliminates the need for manual writing of extraction rules, while providing a white box for the users to review the extraction rules. The users need only provide a small number of the manual label 408 of FIG. 4 to generate rules that can apply to different formats across different websites having complex contents and markup language tags. Generating the rules 308 from the decision tree 302 thereby provides the present invention with a convenient and adaptive method of extraction.

The first software 518 of FIG. 5 of the first device 104 of FIG. 1 can include the navigation system 100. For example, the first software 518 can include the sample extract module 602, the rule module 604, the auto extract module 606, the display module 612, and the extract rate module 614.

The first control unit 506 of FIG. 5 can execute the first software 518 for the sample extract module 602 to extract an instance of the features 212 from an instance of the sample fields 406 with the manual label 408 associated with the point of interest 207, the instance of the features 212 for locating the instance of sample fields 406 in documents 208. The first control unit 506 can execute the first software 518 for the rule module 604 to generate the instance of the rules 308 based on the instance of the features 212 extracted to assign the manual label 408 to an instance of the target fields 206. The first control unit 506 can execute the first software 518 for the auto extract module 606 to extract the instance of target fields 206 from the documents 208 with the manual label 408 assigned by applying the instance of the rules 308 to the documents 208.

The first control unit 506 can execute the first software 518 for the display module 612 to display the target field 208 associated with the point of interest 207 on the first device 104. The first control unit 506 can execute the first software 518 for the extract rate module 614 to request the further sample field 406 when the extraction rate 616 is less than the threshold 618.

The first control unit 506 can execute the first display interface 526 of FIG. 5 to display the target fields 206. The first control unit 506 can also execute the first display interface 526 of FIG. 5 to display the sample fields 406. The first control unit 506 can further execute the first display interface 526 of FIG. 5 to display the rules 308. The second software 536 of FIG. 5 of the second device 106 of FIG. 1 can include the navigation system 100. For example, the second software 536 can include the sample extract module 602, the rule module 604, the auto extract module 606, the display module 612, and the extract rate module 614.

The second control unit 528 of FIG. 5 can execute the second software 536 for the sample extract module 602 to extract an instance of the features 212 from an instance of the sample fields 406 with the manual label 408 associated with the point of interest 207, the instance of the features 212 for locating the instance of sample fields 406 in documents 208. The second control unit 528 can execute the second software 536 for the rule module 604 to generate the instance of the rules 308 based on the instance of the features 212 extracted to assign the manual label 408 to an instance of the target fields 206. The second control unit 528 can execute the second software 536 for the auto extract module 606 to extract the instance of target fields 206 from the documents 208 with the manual label 408 assigned by applying the instance of the rules 308 to the documents 208. The second control unit 528 can execute the second software 536 for the display module 612 to display the target field 208 associated with the point of interest 207 on the first device 104. The second control unit 528 can execute the second software 536 for the extract rate module 614 to request the further sample field 406 when the extraction rate 616 is less than the threshold 618. The second control unit 528 can execute the second display interface 534 of FIG. 5 to display the target fields 206. The second control unit 528 can also execute the second display interface 534 to display the sample fields 406. The second control unit 528 can further execute the second display interface 534 to display the rules 308.

The navigation system 100 can be partitioned between the first software 518 and the second software 536. For example, the second software 536 can include the rule module 604, the auto extract module 606, the display module 612, and the extract rate module 614. The second control unit 528 can execute modules partitioned on the second software 536 as previously described.

The first software 518 can include the sample extract module 602. Based on the size of the first storage unit 508 of FIG. 5, the first software 518 can include additional modules of the navigation system 100. The first control unit 506 can execute the modules partitioned on the first software 518 as previously described.

The first user interface 512 of FIG. 5 can receive the sample fields 406 and the rules 308 from the user, the navigation system 100, or a combination thereof for the display module 612, for example. The second control unit 528 can operate the second communication unit 530 of FIG. 5 to send the target fields 206 to the first device 104. The first control unit 506 can operate the first communication unit 510 of FIG. 5 to do the same. The first control unit 506 can operate the first software 518 to operate the location unit 514 of FIG. 5 to determine the current location 216.

The second communication unit 530 of FIG. 5 can send the target fields 206 to the first device 104 through the communication path 108 of FIG. 1. The target fields 206, the sample fields 406, the rules 308, or a combination thereof can be displayed on the first display interface 526 and the second display interface 534.

The navigation system 100 describes the module functions or order as an example. The modules can be partitioned differently. For example, the rule module 604 and the auto extract module 606. Each of the modules can operate individually and independently of the other modules.

Furthermore, data generated in one module can be used by another module without being directly coupled to each other. For example, the display module 612 can receive the sample fields 406 from the sample extract module 602 to display.

Figure 7:
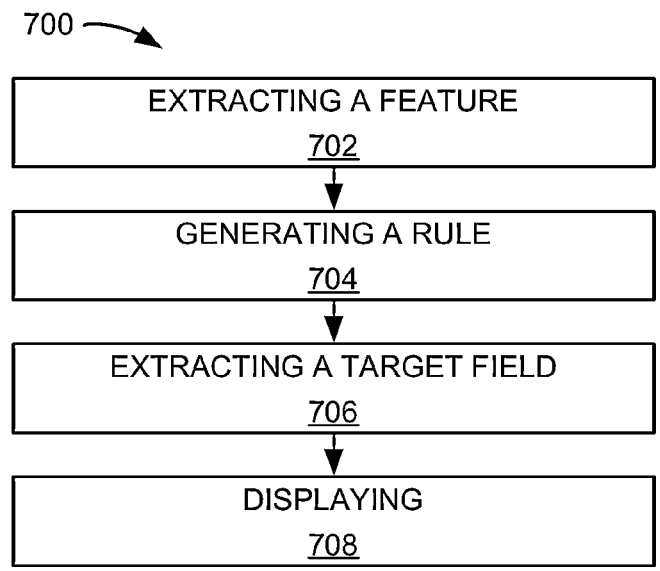
FIG. 7 is a flow chart of a method of operation of the navigation system of FIG. 1 in a further embodiment of the present invention.

Referring now to FIG. 7, therein is shown a flow chart of a method 700 of operation of the navigation system 100 of FIG. 1 in a further embodiment of the present invention. The method 700 includes: extracting a feature from a sample field with a manual label associated with a point of interest, the feature for locating the sample field in a document, in a block 702; generating a rule based on the feature extracted to assign the manual label to a target field, in a block 704; extracting the target field from the document with the manual label assigned by applying the rule to the document, in a block 706; and inserting the target field associated with the point of interest to a location-based guide for displaying on a device, in a block 708.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   extracting a feature from a sample field with a manual label associated with a point of interest, wherein the feature is for locating the sample field in a document;
   generating a rule for parsing a high volume of points of interest with a control unit, based on the feature extracted to assign the manual label to a target field;
   extracting the target field from the document with the manual label assigned by applying the rule based on the feature extracted from the sample field for training, to the document; and
   inserting the target field associated with the point of interest to a location-based guide operated by a device for displaying the inserted target field on the device.

2. The method as claimed in claim 1 wherein generating the rule includes generating the rule with a decision tree.

3. The method as claimed in claim 1 wherein generating the rule includes calculating an information entropy of the sample field.

4. The method as claimed in claim 1 wherein extracting the feature includes extracting the feature having only a binary value.

5. The method as claimed in claim 1 wherein generating the rule includes calculating an information gain of the feature.

6. A method of operation of a navigation system comprising:
   extracting a feature from a sample field with a manual label associated with a point of interest, wherein the feature is for locating the sample field in a document;
   generating a rule for parsing a high volume of points of interest with a control unit, based on the feature extracted to assign the manual label to a target field;
   extracting the target field from the document with the manual label assigned by applying the rule based on the feature extracted from the sample field for training, to the document;
   requesting a further sample field when an extraction rate is less than a threshold; and
   inserting the target field associated with the point of interest to a location-based guide operated by a device for displaying the inserted target field on the device.

7. The method as claimed in claim 6 further comprising:
   receiving a disconfirmation of the rule; and
   wherein:
   extracting the feature includes requesting the sample field when the disconfirmation of the rule is received.

8. The method as claimed in claim 6 wherein extracting the feature includes extracting the feature being syntactic or semantic.

9. The method as claimed in claim 6 wherein extracting the feature includes extracting the feature derived from regular expression filters.

10. The method as claimed in claim 6 wherein generating the rule includes displaying the rule on a second device.

11. A navigation system comprising:
    a control unit:
       for extracting a feature from a sample field with a manual label associated with a point of interest, wherein the feature is for locating the sample field in a document;
       for generating a rule for paring a high volume of points of interest, based on the feature extracted to assign the manual label to a target field;
       for extracting the target field from the document with the manual label assigned by applying the rule based on the feature extracted from the sample field for training, to the document;
       for inserting the target field associated with the point of interest to a location-based guide; and
    a user interface for displaying the inserted target field on a device.

12. The system as claimed in claim 11 wherein the control unit is for generating the rule with a decision tree.

13. The system as claimed in claim 11 wherein the control unit is for calculating an information entropy of the sample field.

14. The system as claimed in claim 11 wherein the control unit is for extracting the feature having only binary values.

15. The system as claimed in claim 11 wherein control unit is for calculating an information gain of the feature.

16. The system as claimed in claim 11 wherein the control unit is for requesting a further sample field when an extraction rate is less than a threshold.

17. The system as claimed in claim 16 wherein the control unit is for:
   receiving a disconfirmation of the rule; and
   requesting the sample field when the disconfirmation of the rule is received.

18. The system as claimed in claim 16 wherein the control unit is for extracting the feature being syntactic or semantic.

19. The system as claimed in claim 16 wherein the control unit is for extracting the feature derived from regular expression filters.

20. The system as claimed in claim 16 wherein the control unit is for displaying the rule on a second device.

\* \* \* \* \*